(12) United States Patent
Hiller

(10) Patent No.: US 12,431,976 B2
(45) Date of Patent: Sep. 30, 2025

(54) CLOSED LOOP POINTING SYSTEM FOR GROUND TO SATELLITE COMMUNICATIONS

(71) Applicant: The Boeing Company, Arlington, VA (US)

(72) Inventor: Nathan D. Hiller, Irvine, CA (US)

(73) Assignee: The Boeing Company, Arlington, VA (US)

(*) Notice: Subject to any disclaimer, the term of this patent is extended or adjusted under 35 U.S.C. 154(b) by 228 days.

(21) Appl. No.: 18/186,635

(22) Filed: Mar. 20, 2023

(65) Prior Publication Data

US 2024/0322906 A1  Sep. 26, 2024

(51) Int. Cl.
*H04B 10/00* (2013.01)
*H04B 10/118* (2013.01)
*H04B 10/50* (2013.01)

(52) U.S. Cl.
CPC ......... *H04B 10/118* (2013.01); *H04B 10/503* (2013.01)

(58) Field of Classification Search
CPC ... H04B 10/11; H04B 10/112; H04B 10/1121; H04B 10/1123; H04B 10/1125; H04B 10/1127; H04B 10/1129; H04B 10/118; H04B 10/114; H04B 10/1143; H04B 10/1149; H04B 10/116; H04B 10/40; H04B 10/503; H04B 7/18513; H04B 7/18504
USPC ....... 398/118, 119, 120, 121, 122, 123, 124, 398/125, 126, 127, 128, 129, 130, 131, 398/135, 136, 115, 116, 117, 33, 38, 25, 398/26, 27, 158, 159
See application file for complete search history.

(56) References Cited

U.S. PATENT DOCUMENTS

| | | | |
|---|---|---|---|
| 10,707,961 B2* | 7/2020 | Turner | H04B 7/195 |
| 2002/0163697 A1* | 11/2002 | Pepper | H04B 10/1125 398/156 |
| 2014/0294399 A1* | 10/2014 | Makowski | H04B 10/118 398/126 |

* cited by examiner

*Primary Examiner* — Hanh Phan
(74) *Attorney, Agent, or Firm* — Yee & Associates, P.C.

(57) ABSTRACT

A satellite communications system comprising a satellite traveling in an orbit and a relay system. The relay system is configured to receive a laser beam encoding information from a terrestrial location and relay the information to the satellite. The relay system is positioned at a selected distance from the satellite and the selected distance is set based on a speed of the satellite.

20 Claims, 12 Drawing Sheets

CLOSED LOOP POINTING SYSTEM FOR GROUND TO SATELLITE COMMUNICATIONS

BACKGROUND INFORMATION

1. Field

The present disclosure relates generally to improved communication system, and in particular, to close loop communications between ground stations and non-geosynchronous satellites.

2. Background

Laser communications involves using a laser to send communications between a satellite and terrestrial location such as a ground station. The laser beam can be sent from the terrestrial location to the satellite and from the satellite to the terrestrial location. Laser beam is often in an infrared portion of the light spectrum. Using infrared light can allow a laser beam to penetrate the atmosphere of the earth with reduced interference.

The coherent light in the laser beam is modulated to encode information that is to be transmitted. When the laser beam is received, that light is decoded back into the information.

This type communications has advantages over radio frequency communications. Laser beams have a much higher frequency than radio frequency signals. As a result, laser beams can carry more information per second. This feature of laser beams enables communications at higher data rates and greater bandwidth. Further, the directionality of laser beams reduces the ability to intercept these types of communications. This feature with encryption can provide greater security as compared to radio frequency signals. Additionally, laser beams are less susceptible to interference as compared to radio frequency signals.

SUMMARY

An embodiment of the present disclosure provides a satellite communications system comprising a satellite traveling in an orbit and a relay system. The relay system is configured to receive a laser beam encoding information from a terrestrial location and relay the information to the satellite. The relay system is positioned at a selected distance from the satellite and the selected distance is set based on a speed of the satellite.

Another embodiment of the present disclosure provides a method for receiving a laser beam encoding information from a terrestrial location. A relay system is positioned at a selected distance from a satellite traveling in an orbit. The selected distance is set based on a speed of the satellite. The laser beam encoding information is received from the terrestrial location. The information is relayed to the satellite in response to receiving the laser beam encoding information from the terrestrial location.

Another embodiment of the present disclosure provides a satellite measurement system comprising a satellite, a relay system, and an analyzer. The relay system is configured to receive a laser beam encoding information from a terrestrial location and relay the information to the satellite. The relay system is positioned at a distance from the satellite and a selected bit error rate is present in the information carried in the laser beam at a selected distance between the satellite and the relay system that is determined based on a speed of the satellite. The analyzer is configured to determine a measured bit error rate in the information relayed to the satellite by the relay system. The analyzer is configured to compare the selected bit error rate with the measured bit error rate to form a comparison. The analyzer is configured to determine the distance between the relay system and the satellite based on the comparison.

Yet another embodiment of the present disclosure provides a method for measuring a position. A laser beam encoding information is received from a terrestrial location at a relay system traveling in an orbit at a distance from a satellite traveling in the orbit. The information is relayed to the satellite in response to receiving the laser beam encoding information from the terrestrial location. A measured bit error rate in the information relayed to the satellite by the relay system is determined. A selected bit error rate is compared with the measured bit error rate to form a comparison. The distance between the relay system and the satellite is determined based on the comparison.

Another embodiment of the present disclosure provides a turbulence measurement system comprising a set of satellite communications systems and an analyzer. A satellite communications system in the set of satellite communications systems comprises a satellite; and a relay system that is configured to receive a laser beam encoding information from a terrestrial location and relay the information to the satellite. The relay system is positioned at a selected distance from the satellite and the selected distance is based on a speed of the satellite. The analyzer is configured to determine bit error rates for laser beams encoding the information received by a set of the satellite communications systems from terrestrial locations. The analyzer is configured to compare the bit error rates to an expected bit error rate without turbulence to form comparisons. The analyzer is configured to determine relative turbulence levels based on the comparisons of the bit error rates to the expected bit error rate.

In still another embodiment of the present disclosure a method for measuring turbulence is provided. Laser beams encoding information is received from terrestrial locations at set of satellite systems. A satellite system in the set of satellite systems comprises a satellite; and a relay system that is configured to receive a laser beam encoding information from a terrestrial location and relay the information to the satellite, wherein the relay system is positioned at a selected distance from the satellite and the selected distance is based on a speed of the satellite. Bit error rates are determined for the laser beams encoding the information received by the set of the satellite systems from terrestrial locations. The bit error rates are compared to an expected bit error rate without turbulence to form comparisons. Relative turbulence levels are determined based on the comparisons of the bit error rates to the expected bit error rate.

Another embodiment of the present disclosure provides a turbulence measurement system comprising a set of satellite communications systems and an analyzer. A satellite communications system in the set of satellite communications systems comprises a satellite and a relay system. The relay system is configured to receive a laser beam encoding information from a terrestrial location and relay the information to the satellite. The relay system is positioned at a selected distance from the satellite and the selected distance is based on a speed of the satellite. The analyzer is configured to determine attributes for laser beams encoding the information received by the set of the satellite communications systems from terrestrial locations. The analyzer is configured to compare the attributes to an expected attribute without turbulence to form comparisons. The analyzer is configured to determine relative turbulence levels based on the comparisons of the attributes to the expected attribute.

In still another embodiment of the present disclosure a method for measuring turbulence is provided. Laser beams encoding information is received from terrestrial locations at a set of satellite systems. A satellite system in the set of satellite systems comprises a satellite and a relay system that is configured to receive a laser beam encoding information from a terrestrial location and relay the information to the satellite, wherein the relay system is positioned at a selected distance from the satellite and the selected distance is based on a speed of the satellite. Attributes for the laser beams encoding the information received by the set of the satellite systems from terrestrial locations are determined. The attributes are compared to an expected attribute without turbulence to form comparisons are compared. Relative turbulence levels based on the comparisons of the attributes to the expected attribute are determined.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 2:
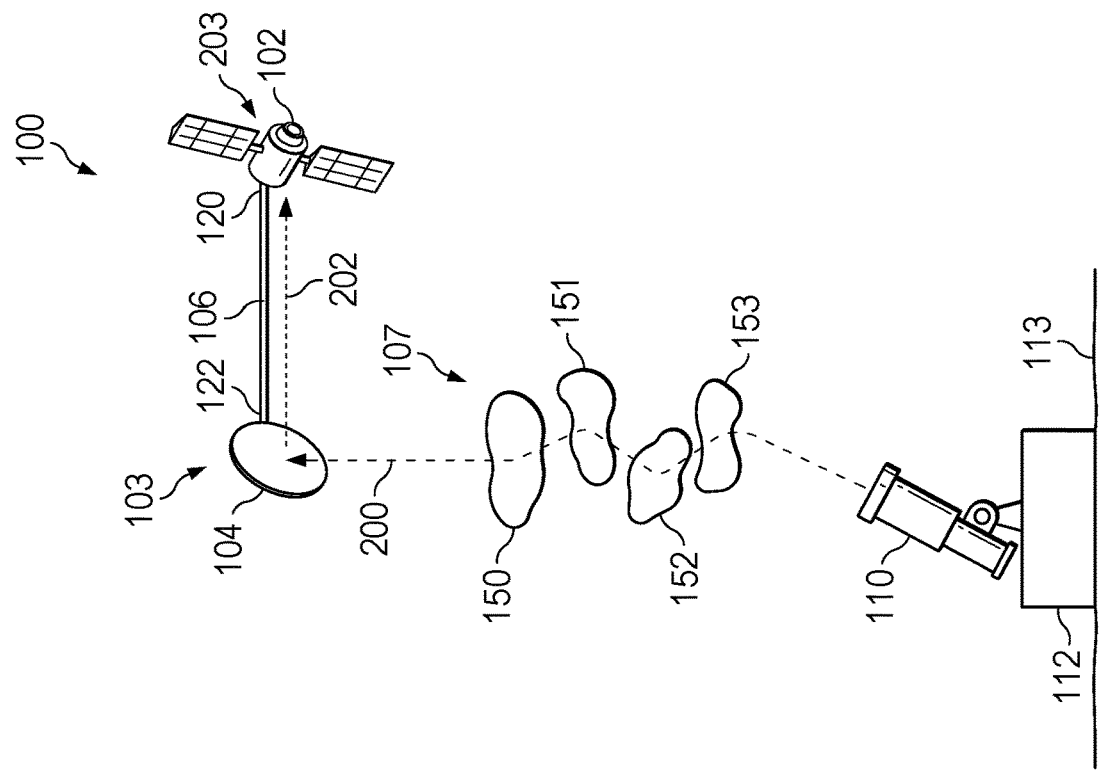
FIG. 2 is a pictorial representation of the satellite communication system in accordance with an illustrative embodiment.

The illustrative embodiments recognize and take into account one or more different considerations as described herein. Laser communications have challenges resulting from traveling through the atmosphere. Atmospheric interference can gather or absorb the light in the laser beam. Further, receiving and transmitting laser beams between a satellite and a laser communications system at the terrestrial location can be challenging with the need for precise alignment. Laser beams have a link budget with respect to the amount of power needed to read data in the laser beam. For example, if a laser beam is transmitted using one watt of power, a detector in the laser communications system at the terrestrial location may need to have at least one microwatt of power. This power can result in a high bit error rate that can be unacceptable.

For example, turbulence in the atmosphere can change the path of the downlink laser beam. The path of the downlink laser beam from the satellite to laser communications system can have a curve or other shape other than a straight line when traveling through turbulence in the atmosphere. As a result, the optics in the laser communications system may not be able to receive the laser beam with a desired level of power without corrections.

For example, the downlink laser beam may be off center from the lens in a telescope used to receive the laser beam in the laser communications system. The angle of the telescope can be changed to receive the laser beams such that the laser beam is centered within the lens to increase the power which the downlink laser beam is detected. In sending information back to the satellite in another laser beam, the laser communications system can use the same angle. In other words, the angle for the downlink laser beam is matched to angle for the uplink laser beam. This type of transmission of data works because the same propagation path is used in both the downlink and uplink directions. This type of propagation path is a closed-loop path that results from the close loop pointing the laser beam in the uplink direction.

This type of transmission is useful with stationery or slow-moving satellites. These types satellites are known as geosynchronous satellites. The closed-loop path is less useful with satellites that are not stationary. For example, low earth orbit (LEO) satellites move faster and are not stationary with respect to the terrestrial locations. As result, when laser communications system sends the uplink laser beam back up the same path as the downlink laser beam, the satellite may have moved far enough that the uplink laser beam is not received by the satellite. In other words, the uplink laser beam can miss the satellite.

One solution involves positioning the laser such that the uplink laser beam is pointed ahead of the satellite from the current location to the expected location. This type of correction, however, may not always work because the angle of correction determined from pointing may have a different propagation path because of differences in turbulence.

Thus, illustrative embodiments provide a method, apparatus, and system for satellite communications. In one illustrative example, a satellite communication system comprises a satellite traveling in orbit and a relay system. The relay system is configured to receive a laser beam encoding information from a terrestrial location and relay the information to the satellite. The relay system can be positioned at a selected distance from the satellite, wherein the selected distance is set based on a speed of the satellite. With this type of communication system, the indications laser system in the terrestrial location can use a closed-loop path without needing to predict or project the location of the satellite. As result, the use of close loop pointing for downlink and uplink communications using laser beams can be used with this type of satellite communications system.

Figure 1:
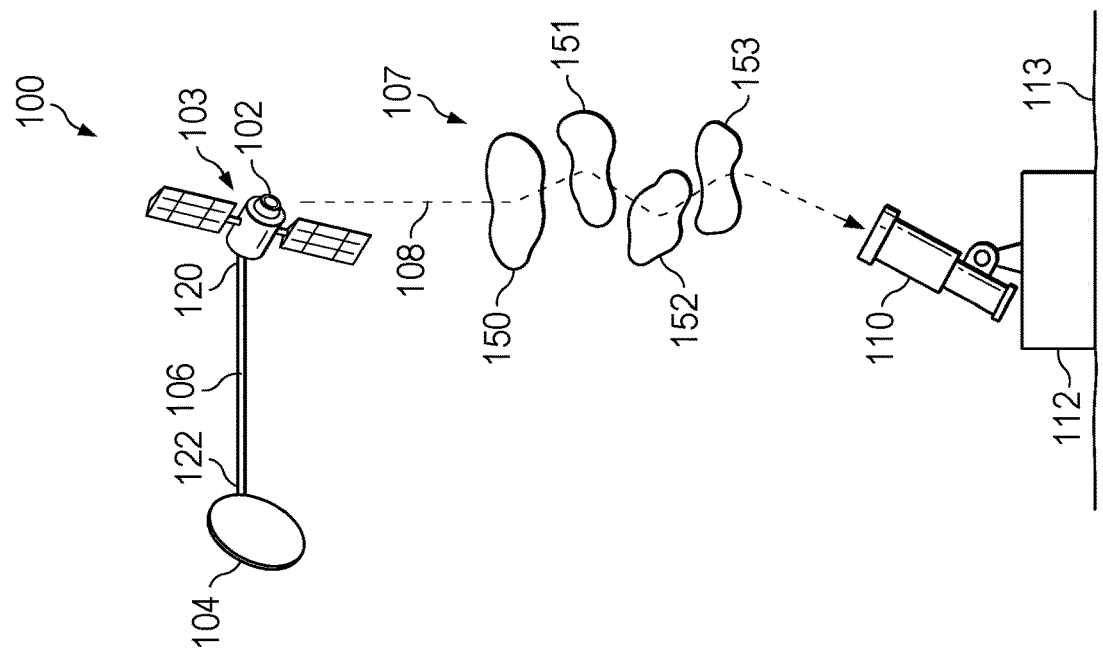
FIG. 1 is a pictorial representation of a satellite communication system in which illustrative embodiments may be implemented.

With reference now to the figures and, in particular, with reference to FIG. 1, a pictorial representation of a satellite communication system is depicted in which illustrative embodiments may be implemented. This illustrative example, satellite communications system 100 comprises satellite 102 with reflector 104 connected to satellite 102 by boom 106.

As depicted, boom 106 has first end 120 connected to satellite 102. Reflector 104 is connected to second end 122 of boom 106.

As depicted, satellite 102 transmits downlink laser beam 108 to telescope 110 in terrestrial laser communications system 112 while satellite 102 is in first position 103. In this example, terrestrial laser communications system 112 is on ground 113. In this example, telescope 110 includes optics and other devices for receiving and detecting downlink laser beam 108.

As depicted in this example, downlink laser beam 108 does not travel in a straight line. Instead, downlink laser beam 108 includes a curve or nonlinear portion caused by the atmosphere conditions such as air turbulence 107. As depicted, air turbulence 107 can be comprised of turbulent cells such as turbulence cell 150, turbulence cell 151, turbulence cell 152, and turbulence cell 153. These turbulent cells are pockets of turbulence.

In this example, the air turbulence can be substantially clear air and not include substantial amounts of particles. The change in the path can result in the laser beam traveling in a path that is a curve, change directions with variable angles, or with some other shape depending on the changes in the refractive index caused by air turbulence 107.

This current nonlinear portion results in an angle of arrival of downlink laser beam 108. In this illustrative example, terrestrial laser communications system 112 can track this angle to receive downlink laser beam 108 with a desired level of power.

Turning to FIG. 2, another pictorial representation of the satellite communication system is depicted in accordance with an illustrative embodiment. As depicted, satellite 102 is a low earth orbit (LEO) satellite moving at a speed that results in the satellite no longer being in first position 103 when satellite communication system transmits uplink laser beam 200 telescope 110. As illustrated in this example, satellite 102 is now in second position 203.

In this example, uplink laser beam 200 is transmitted using closed loop pointing. In other words, the angle tracked for downlink laser beam 108 is the same angle used to transmit uplink laser beam 200.

As depicted, with the speed of satellite 102, satellite 102 is no longer in the same position from when satellite 102 transmitted downlink laser beam 108. In the second position, uplink laser beam 200 misses satellite 102.

However, reflector 104 in satellite communications system 100 is positioned a distance from satellite 102 such that reflector 104 is now in first position 103. As a result, uplink laser beam 200 hits reflector 104. In this illustrative example, reflector 104 has an orientation such that uplink laser beam 200 is reflected by reflector 104 from first position 103 as reflected laser beam 202 at satellite 102. As a result, the information in uplink laser beam 200 is relayed to satellite 102 at second position 203.

In this illustrative example, boom 106 has a length that is selected based on the distance that satellite 102 travels from first position 103 to second position 203 in the time that downlink laser beam 108 and uplink laser beam 200 are transmitted. In this example is assumed that uplink laser beam 200 is transmitted as soon as possible in response to receiving downlink laser beam 108.

Thus, satellite communications system 100 enables communications between terrestrial laser communications system 112 and satellite communications system 100 using closed loop pointing. As result, complex calculations for predicting second position 203 of satellite 102 are unnecessary. As previously discussed, these calculations are error-prone because the calculations are unable to take into account the atmospheric conditions present in the atmosphere such as clear air turbulence.

For example, the path taken by downlink laser beam 108 may encounter a first amount of turbulence. In attempting to point ahead and determine the path to satellite 102 at second position 203, it is unclear as to whether any turbulence or some other level turbulence will be present as compared to the turbulence in path used for downlink laser beam 108. As a result, calculating an angle to point the laser to transmit uplink laser beam 200 to satellite 102 at second position can be difficult and error-prone because the propagation path varies depending on atmospheric conditions. As a result, terrestrial laser communications system 112 cannot rely on the angle correction determined for receiving downlink laser beam 108.

Figure 3:
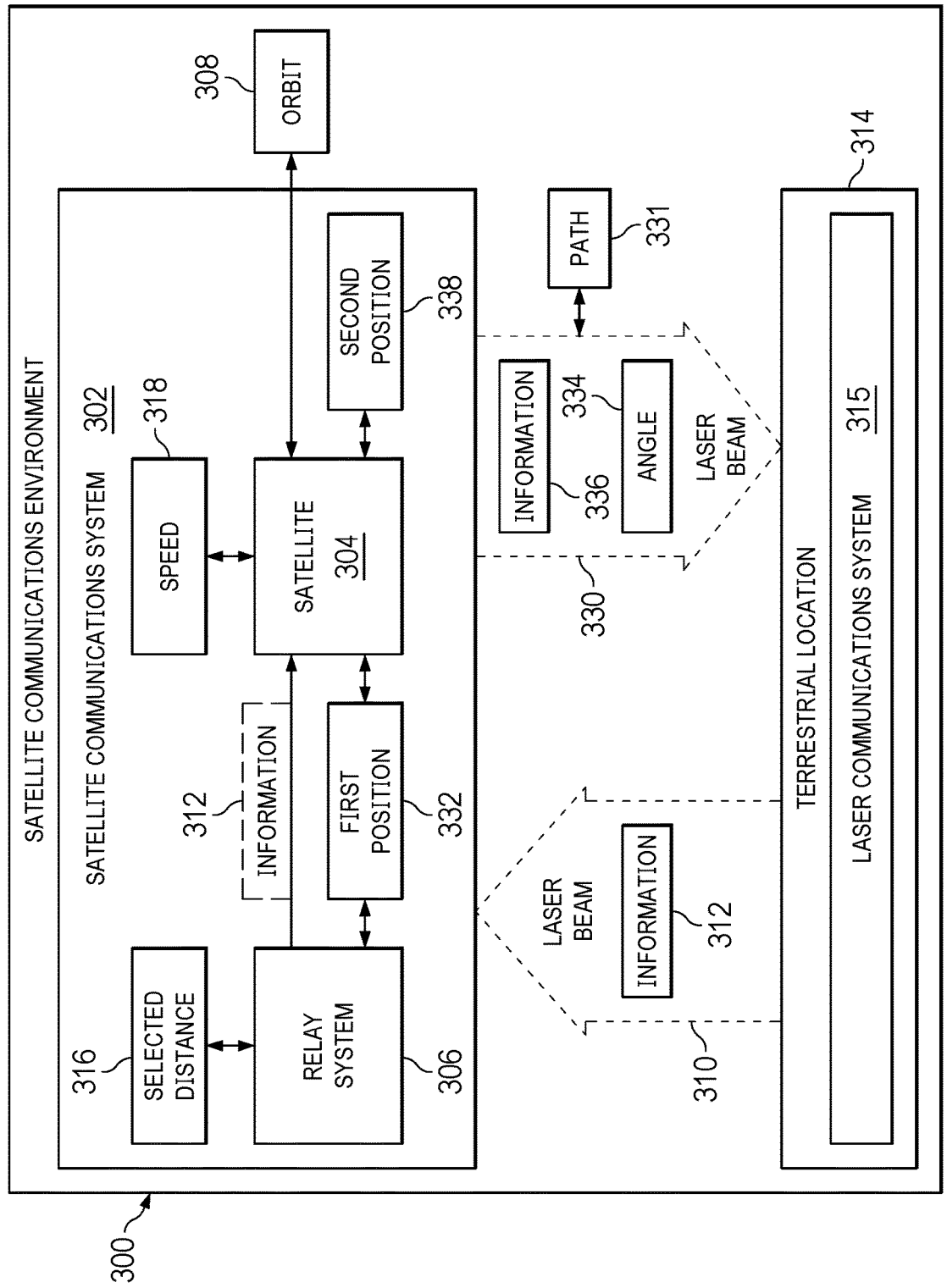
FIG. 3 is a block diagram of a light communications environment in accordance with an illustrative embodiment.

With reference now to FIG. 3, a block diagram of a light communications environment is depicted in accordance with an illustrative embodiment. In this illustrative example, satellite communications environment 300 includes components that can be implemented in hardware such as the hardware shown for satellite communications system 100 in FIG. 1.

As depicted, satellite communications system 302 comprises satellite 304 and relay system 306. Satellite 304 travels in orbit 308.

In this example, relay system 306 is configured to receive laser beam 310 encoding information 312 from terrestrial location 314 and relay information 312 to satellite 304.

Terrestrial location 314 can be, for example, a ground location, a water location, and air location, or some other location on earth or in atmosphere of the earth. In this example, laser beam 310 originates from laser communications system 315 at terrestrial location 314.

As depicted, relay system 306 is positioned at selected distance 316 from the satellite. Further in this example, selected distance 316 is set based on speed 318 of the satellite 304. For example, selected distance 316 is selected such that laser beam 330 sent by satellite 304 at first position 332 is detected by laser communications system 315 at terrestrial location 314.

In this illustrative example, first position 332 is an angular position. An angular position is a measure of an object orientation or rotational position with spec to a chosen reference point or axis. An angular position can be measured in radians or degrees and represents the angle between the reference point in a line connecting the reference point to the object. In this illustrative example, the reference point can be the location of laser communications system 315 at terrestrial location 314.

In this example, with determining the angle of the received beam, laser beam 330, laser communications system 315 can transmit laser beam 310 at that same angle plus an additional angle (i.e., point ahead). The additional angle is determined by the speed of the satellite and its orbit radius using known calculation techniques.

Laser communications system 315 is configured to determine angle 334 at which laser beam 330 is received. As depicted, laser beam 330 travels on path 331. This path can be a nonlinear path caused by atmospheric conditions such as air turbulence. As a result, laser beam 330 is received by laser communications system 315 at angle 334. Laser communications system 315 corrects for this angle to reduce the bit error rate for information 336 received in laser beam 330.

Laser communications system 315 sends laser beam 310 encoding information 312 using the same correction determined for angle 334. Laser beam 310 also travels on path 331. In this case, satellite 304 is no longer in first position 332. Instead, satellite 304 is at second position 338.

Selected distance 316 for relay system 306 is selected such that relay system 306 is in first position 332 when laser beam 310 is sent by laser communications system 315 at terrestrial location 314 on path 331. In one illustrative example, first position 332 and second position 338 are angular positions. With this example, selected distance 316 can be selected such that relay system 306 is in the same angular position, first position 332, when laser communications system 315 transmits laser beam 310 from terrestrial location 314. In this manner, laser beam 310 can be transmitted using closed loop pointing resulting in increased accuracy even though atmospheric conditions such as clear turbulence can change the path of laser beam 310 because laser beam 310 travels in the same path, path 331, as laser beam 330.

Figure 4:
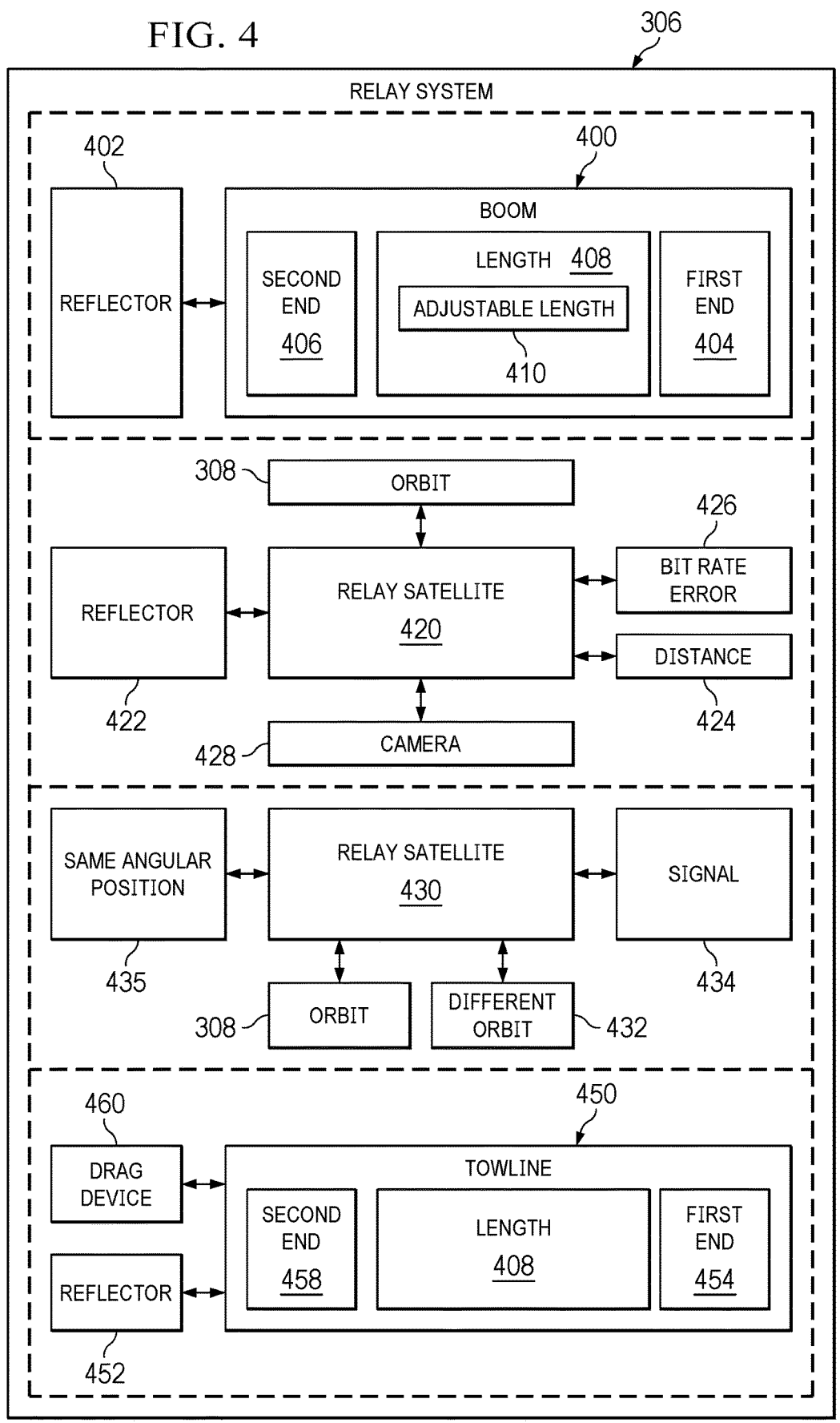
FIG. 4 is an illustration of components for a relay system in accordance with an illustrative embodiment.

Turning next to FIG. 4, an illustration of components for a relay system is depicted in accordance with an illustrative embodiment. In the illustrative examples, the same reference numeral may be used in more than one figure. This reuse of a reference numeral in different figures represents the same element in the different figures.

As depicted, relay system 306 can be implemented using a number of different components. In one illustrative example, relay system 306 comprises boom 400 and reflector 402. Boom 400 has first end 404 and second end 406. First end 404 is configured to be connected to satellite 304. Second end 406 is connected to reflector 402. In this example, boom 400 has length 408 that positions reflector 402 at selected distance 316 from satellite 304. Length 408 can vary depending on the speed of satellite 304. For example, length 408 can be 10 meters, 40 meters or some other length.

In some illustrative examples, length 408 can be adjustable length 410. When boom 400 has adjustable length 410 the adjustability can be provided in a number of different ways. For example, boom 400 can have a telescoping structure having components that can slide with respect to each other to change length 408 of boom 400. This configuration of boom 400 can be used to deploy and retrieve reflector 402 in addition to setting length 408 to provide the selected distance between reflector 402 and satellite 304.

In another illustrative example, boom 400 can be a deformable structure that is rolled onto a spool and deployed once satellite 304 is launched with reflector 402. For example, boom 400 can be deployable composite boom. This deployable composite boom can be comprised of a thin-shell rollable composite boom. this type of boom can be a continuous tow shear aligned mat (CTM).

In this example, reflector 402 used to reflect laser beam 310 is a mirror system comprising a set of mirrors. As used herein, a "set of" when used with reference to items means one or more items. For example, a set of mirrors is one or more mirrors. The set of mirrors can be arranged to reflect laser beam 310 in a desired direction.

Reflector 402 has an orientation that reflects laser beam 310 encoding information 312 from terrestrial location 314 to satellite 304. This orientation can be set based on the expected direction from which laser beam 310 is received and the location of satellite 304.

Reflector 104 and boom 106 in satellite communications system 100 in FIG. 1 and FIG. 2 is an example of an implementation for relay system 306.

In another illustrative example, relay system 306 can comprise relay satellite 420 and reflector 422 connected to relay satellite 420. In this example, relay satellite 420 can travel in orbit 308 ahead of or behind satellite 304 at selected distance 316 from satellite 304. Relay satellite 420 can be a satellite selected from a group comprising a CubeSat, a mini satellite, a micro satellite, a nano satellite, a pico satellite, or other suitable type of satellite.

In this example, relay satellite 420 can position reflector 422 at selected distance 316 from the satellite. Reflector has an orientation that reflects laser beam 310 encoding information 312 from terrestrial location 314 to satellite 304.

In this illustrative example, relay satellite 420 is configured to change distance 424 relative to satellite 304 to reduce a bit error rate 426 for information 312 carried in laser beam 310. For example, satellite 304 can send bit error rate 426 determined from decoding information 312 from laser beam 310.

Relay satellite 420 can change distance 424 in a manner to reduce bit error rate 426. For example, relay satellite 420 can increase and decrease distance 424 such that bit error rate 426 is reduced. Once a minimum bit error rate is identified, relay satellite 420 can maintain distance 424 as long as the bit error rate does not increase.

In this illustrative example, the determination of distance 424 to satellite 304 can be made using camera 428. In this example, camera 428 generates images selected from of at least one of satellite 304 or the relay satellite 420. As depicted, camera 428 can generate images of satellite 304 when connected to relay satellite 420. In another illustrative example, camera 428 can be connected to satellite 304 and generate images of relay satellite 420. The size and orientation of relay satellite 430 in the images can be used to determine distance 424 of relay satellite 420 to satellite 304.

In another example, relay system 306 comprises relay satellite 430. In this example, relay satellite 430 can travel in orbit 308 ahead of or behind satellite 304. In another example, relay satellite 430 can travel in different orbit 432 from satellite 304.

When relay satellite 430 travels in orbit 308, relay satellite 430 travels at selected distance 316 from satellite 304. In this example, relay satellite 430 receives laser beam 310 encoding information 312 from terrestrial location 314.

In this example, relay satellite 430 relays information 312 decoding information 312 from laser beam 310; encoding 312 into signal 434; and transmits signal 434 encoding information 312 to satellite 304.

Signal 434 can take a number different forms. For example, signal 434 can be selected from at least one of a laser beam, a radio frequency signal, a microwave signal, an infrared signal, or other types suitable type of signal.

When relay satellite 430 is in different orbit 432, relay satellite 430 may not always be in the correct position for relaying information 312 to satellite 304.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this example, relay satellite 430 receives laser beam 310 encoding information 312 from terrestrial location 314 and relays information 312 to satellite 304 in response to relay satellite 420 being the same angular position 435 as satellite 304 was when a prior laser beam was transmitted by the satellite to the terrestrial location.

In yet another illustrative example, relay system 306 can comprise towline 450 and reflector 452. With this example, towline 450 has first end 454 connected to satellite 304. Reflector 452 is connected to second end 458 of towline 450. As depicted, towline 450 has length 408 that positions reflector 452 the selected distance 316 from satellite 304. In this example, reflector 452 has an orientation that reflects laser beam 310 encoding information 312 from terrestrial location 314 to satellite 304.

Additionally, drag device 460 can also be attached to second end 458. Drag device 460 may be used in some cases to maintain tension in towline to maintain length 408 to maintain selected distance 316 from satellite 304. Drag device 460 can take a number different forms. For example, drag device 460 can be a structure comprised of an aerogel, the solar sail, or other suitable device that is effective for creating drag when air resistance is extremely low or absent.

Thus, the illustrative examples solve an issue with receiving laser beams when atmospheric conditions change the path of the laser beams. The different illustrative examples can provide a solution to a problem with using a closed loop pointing system to send a return laser beam when atmospheric conditions such as turbulence are present.

The different illustrative examples enable receiving laser beams from terrestrial locations with fast-moving satellites. The presence of atmospheric conditions that change the path of the laser beam are not an issue with respect to the angle at which the laser beam is received. The relay system, in the different illustrative examples, avoids needing to predict a point ahead angle for satellites that are not stationary.

The illustration of satellite communications environment 300 in the different components in FIGS. 3-4 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although satellite 304 is shown as being in front of relay system 306, this positioning of the functional blocks does not limit the actual physical positioning of satellite 304 relative to relay system 306. In another illustrative example, relay system 306 can be in front of satellite 304 relative to movement of satellite communications system 302 in orbit 308.

Figure 5:
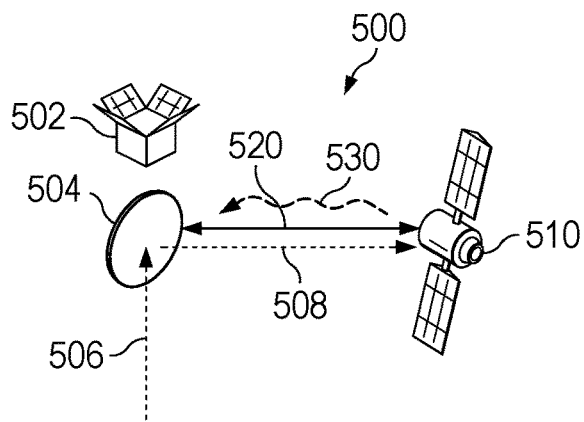
FIG. 5 is an illustration of an example of a satellite communications systems in accordance with an illustrative embodiment.

Turning now to FIG. 5, an illustration of an example of a satellite communications systems is depicted in accordance with an illustrative embodiment. In this illustrative example, satellite communications system 500 is an example of satellite communications system 302 shown in block form in FIG. 3. In this example, satellite communications system 500 is in a non-geosynchronous orbit.

As depicted, satellite communications system 500 comprises relay satellite 502, reflector 504, and satellite 510. Reflector 504 is connected to relay satellite 502.

Relay satellite 502 and reflector 504 form a relay system, which is an example of relay system 306 shown in block form in FIG. 3. In this example, relay satellite 502 is a CubeSat satellite. Relay satellite 502 is an example of relay satellite 420 in FIG. 4 and reflector 422 is an example of reflector 422 in FIG. 4.

In this example, laser beam 506 is reflected by reflector 504 as reflected laser beam 508 to satellite 510. In this example, laser beam 506 originates from a terrestrial location and is sent using a close loop pointing system. In this example, reflector 504 is in the same angular position as satellite 510 when satellite 510 sent a prior laser beam received by the terrestrial location.

In this illustrative example, reflector 504 is at distance 520 from satellite 510. Distance 520 is selected such that reflector 504 has the same angular position as satellite 510 when sent a prior laser beam transmission to the terrestrial location. Laser beam 506 is sent using close loop pointing from the terrestrial location.

As depicted in this example, relay satellite 502 can change distance 520 of reflector 504 to satellite 510. This change in distance 520 can be made to reduce errors in receiving information in laser beam 506. This determination can be made by measuring the bit error rate in information decoded from reflected laser beam 508.

As depicted, satellite 510 can provide instructions sent in signals 530 to relay satellite 502 to increase or decrease distance 520 based on changes in the bit error rate. These instructions can include whether an increase or decrease in errors has occurred. Relay satellite 502 can make changes based on those instructions. In another example, satellite 510 can send the distance change in signals 530. In this example, signals 530 can be radio frequency signals.

Figure 6:
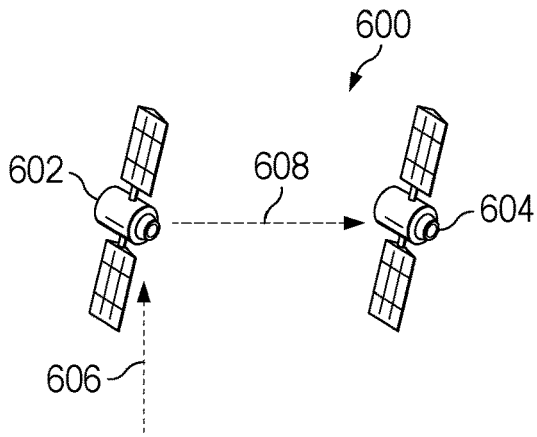
FIG. 6 is an illustration of an example of a satellite communications system in accordance with an illustrative embodiment.

With reference next to FIG. 6, an illustration of an example of a satellite communications system is depicted in accordance with an illustrative embodiment. In this illustrative example, satellite communications system 600 is an example of satellite communications system 302 shown in block form in FIG. 3. In this example, satellite communications system 500 is in a non-geosynchronous orbit.

As depicted, satellite communications system 500 comprises relay satellite 502 and satellite 510. Relay satellite 502 is an example of an implementation for relay system 306 shown in FIG. 3 and is an example of relay satellite 430 in FIG. 4.

In this example, laser beam 606 is received by relay satellite 602 from a terrestrial location. Laser beam 606 is sent using a closed loop pointing process based on a prior laser beams sent by satellite 604.

In this example, relay satellite 602 is in the same angular position as satellite 604 was when satellite 604 sent a prior laser beam to the terrestrial location. This same angular position can be obtained when satellite 602 has a selected distance from satellite 604. As a result, the angular correction that was used to receive the prior laser beam is used to transmit laser beam 606 as part of a closed loop pointing process.

Relay satellite 602 decodes the information in laser beam 606. Relay satellite 602 then relays that information to satellite 604 by transmitting signal 608 to satellite 604.

In this illustrative example, relay satellite 602 can be in the same orbit as satellite 604. In some illustrative examples, relay satellite 602 can be in a different orbit. In this instance, relay satellite 602 can relay information when relay satellite 602 moves to the same angular position as satellite 604 was at when satellite 604 previously transmitted a laser beam resulting in the transmission of laser beam 606 and enclosed loop pointing process used by the terrestrial location. In other words, relay satellite 602 does not need to be in same orbit as satellite 604. However, the availability of relay satellite 602 to relay information may be less because of the different orbit traveled by relay satellite 602.

Figure 7:
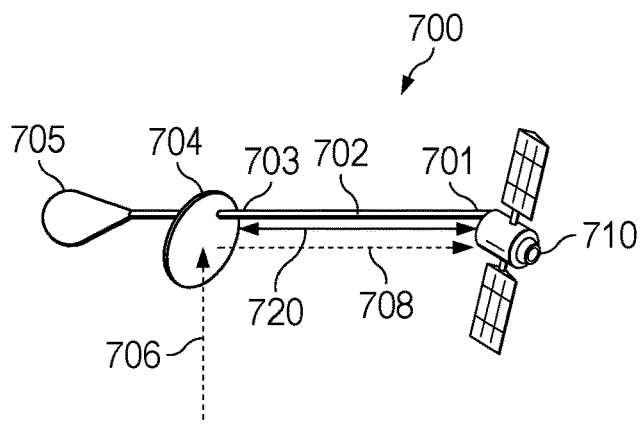
FIG. 7 is an illustration of an example of a satellite communications systems in accordance with an illustrative embodiment.

Turning next to FIG. 7, an illustration of an example of a satellite communications systems is depicted in accordance with an illustrative embodiment. In this illustrative example, satellite communications system 700 is an example of satellite communications system 302 shown in block form in FIG. 3. In this example, satellite communications system 700 is in a non-geosynchronous orbit.

As depicted, satellite communications system 500 comprises towline 702, reflector 704, drag device 705, and satellite 710. In this example, first end 701 of towline 702 is connected to satellite 710. Second end 703 of towline 702 is connected to reflector 704. As depicted, drag device 705 is also connected to second end 703 of towline 702.

Towline 702, reflector 504, and drag device 705 form a relay system and is an example of relay system 306 shown in block form in FIG. 3. As depicted, towline 702, reflector 504, and drag device 705 are examples of towline 450, reflector 452, and drag device 460, respectively, in FIG. 4.

In this example, laser beam 706 is reflected by reflector 704 as reflected laser beam 708 to satellite 710. Further, in this example, laser beam 506 originates from a terrestrial location and is sent using a close loop pointing system. Reflector 704 is at distance 720 from satellite 710 such that reflector 704 is in the same angular position as satellite 710 when satellite 710 sent a prior laser beam received by the terrestrial location. Thus, a close loop pointing process can be used to transmit laser beam 706 using the same path as a prior laser beam transmitted by satellite 710.

Figure 8:
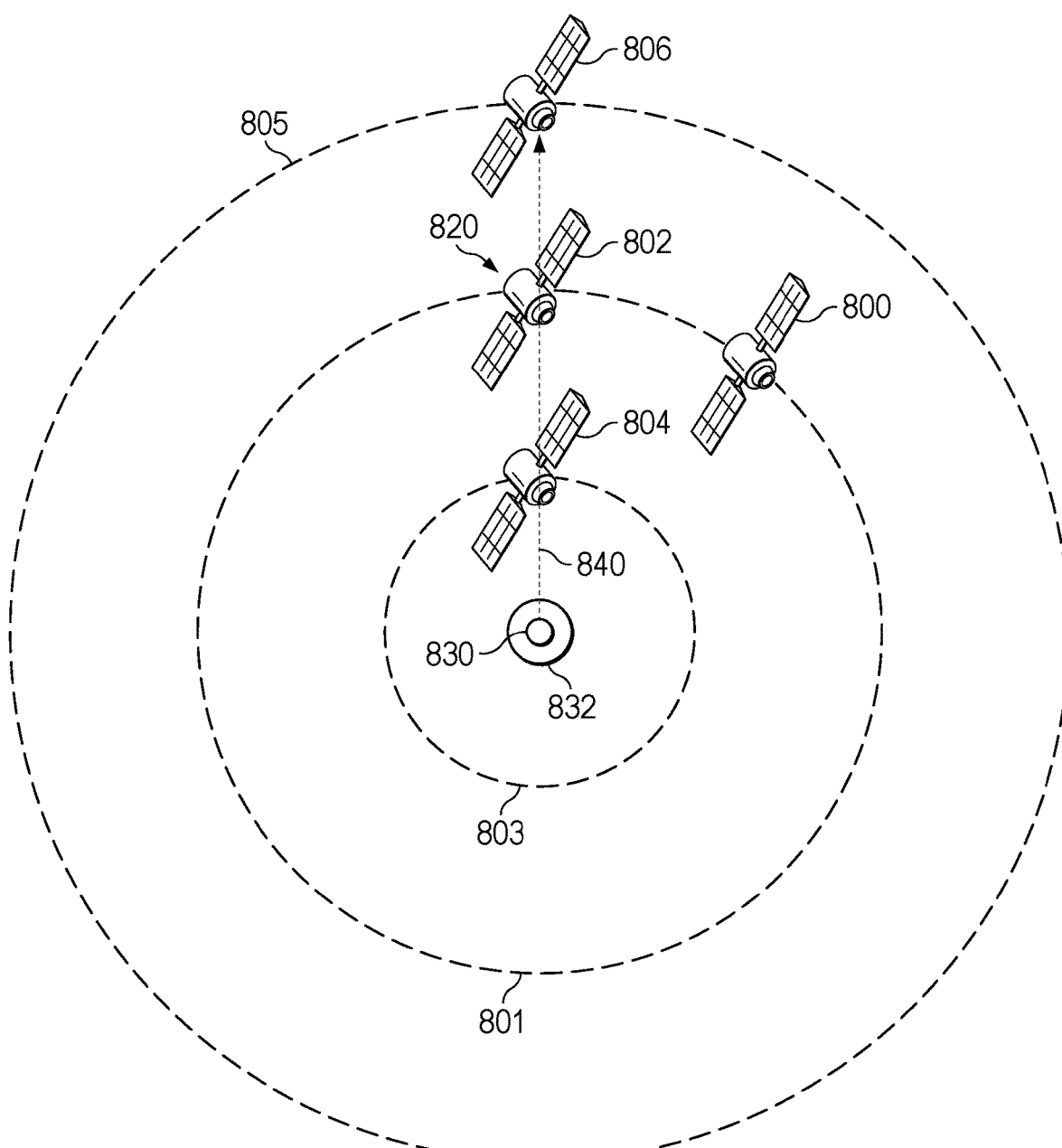
FIG. 8 is an illustration of orbits and angular positions in accordance with an illustrative embodiment.

With reference next to FIG. 8, an illustration of orbits and angular positions is depicted in accordance with an illustrative embodiment. As depicted, satellite 800 is in orbit 801. In this example, orbit 801 is not a geosynchronous orbit such that satellite 800 remains stationary over a particular position on earth.

Relay satellite 802, also travels in orbit 801. Satellite 800 was in angular position 820 when satellite 800 transmitted a prior laser beam to terrestrial location 830 on earth 832. Satellite 800 has moved away from angular position 820 since transmitting the prior laser beam.

In one example, the tracking of the angular position can be performed first by using a coarse tracking mechanism. The received light is focused onto a quad cell detector. This detector is comprised of four detectors arranged in four blocks inside of a square. If the focused light strikes one of the cells and not the others, the tracking mechanism of the telescope changes its angle to bring the focused light towards the center. The process can be repeated until all four quad cells detect the light.

A fine tracking mechanism can be used after the coarse tracking. With this mechanism, the exact amount of light received by each of the four quad cells are used to reposition the telescope angle such that the beam power striking all four cells is equal for all four cells.

In this illustrative example, relay satellite 802 travels at a selected distance from satellite 800 such that relay satellite 802 is in angular position 820 when laser beam 840 is transmitted from terrestrial location 830 using a close loop pointing process. As a result, laser beam 840 travels in the same path as a prior laser beam back to angular position 820 where relay satellite 802 is now located. As a result, relay satellite 802 can receive laser beam 840, decode information encoded in laser beam 840, and transmit that information to satellite 800 and a signal.

Further in this example, satellite 804 travels in orbit 803. Although satellite 804 travels in a different orbit from satellite 800, satellite 804 can also receive laser beam 840 when satellite 804 is in the same angular position that satellite 800 was when satellite 800 transmitted the prior laser beam to terrestrial location 830.

Further, satellite 806 travels in orbit 805. In a similar fashion, satellite 806 can also receive laser beam 840 and transmit information encoded in this laser beam to satellite 800 when satellite 806 is in the same angular position as satellite 800 was when satellite 800 originally transmitted the prior laser beam to terrestrial location 830 on earth 832.

Figure 9:
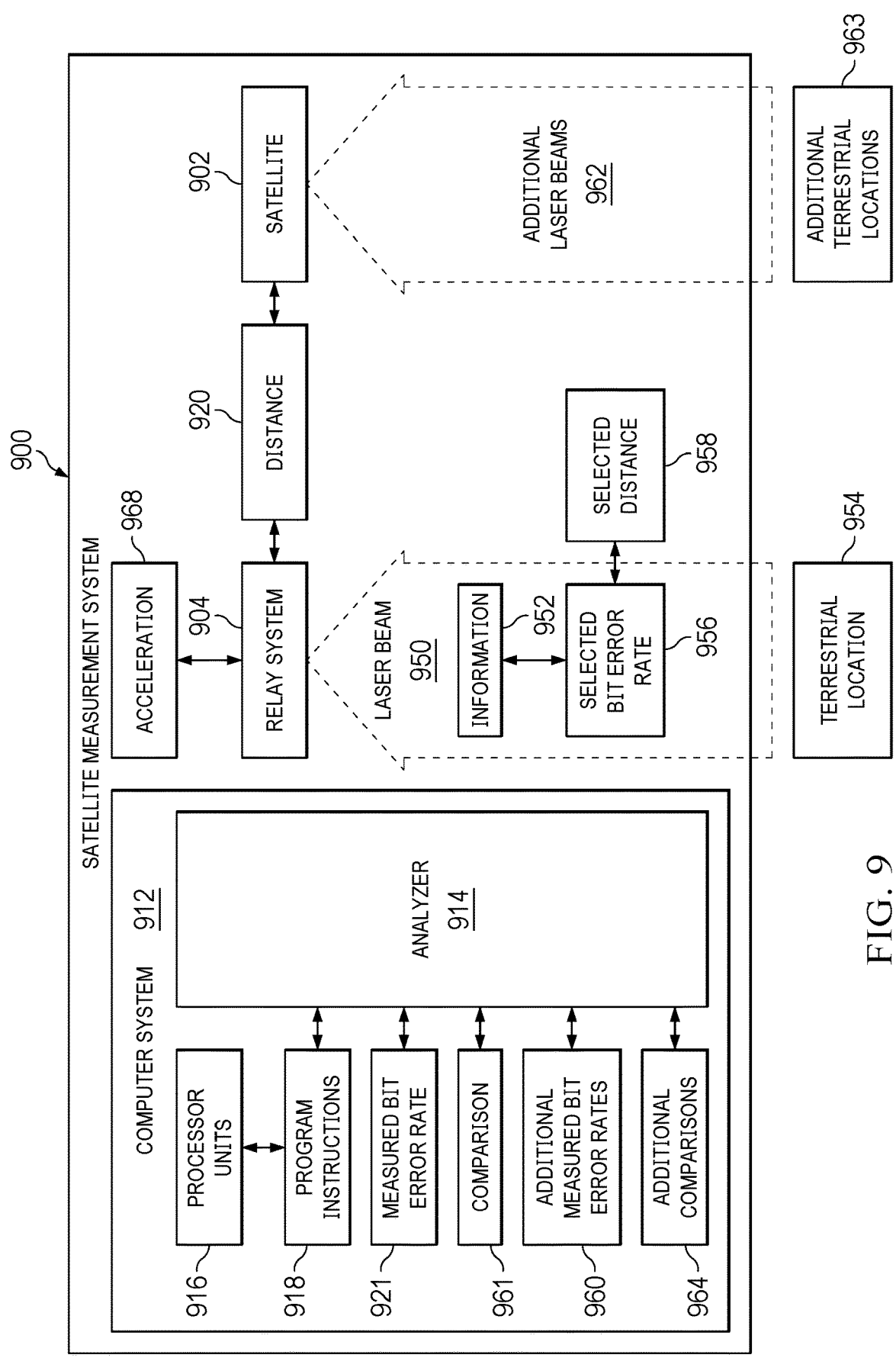
FIG. 9 is an illustration of a block diagram of a satellite measurement system in accordance with an illustrative embodiment.

With reference next to FIG. 9, an illustration of a block diagram of a satellite measurement system is depicted in accordance with an illustrative embodiment. As depicted, satellite measurement system 900 comprises satellite 902 and relay system 904, computer system 912, and analyzer 914 in computer system 912.

In this example, relay system 904 can receive laser beam 950 encoding information 952 from terrestrial location 954 and relay information 952 to satellite 902. In this example, relay system 904 is positioned at a distance 920 from satellite 902. Selected bit error rate 956 is present in information 952 encoded in laser beam 950 at selected distance 958 between satellite 902 and relay system 904 that is determined based on a speed of satellite 902.

In this illustrative example, analyzer 914 can determine distance 920 between relay system 904 and satellite 902 based on bit error rates in information 952. Analyzer 914 can be implemented in software, hardware, firmware or a combination thereof. When software is used, the operations performed by analyzer 914 can be implemented in program instructions configured to run on hardware, such as a processor unit. When firmware is used, the operations performed by analyzer 914 can be implemented in program instructions and data and stored in persistent memory to run on a processor unit. When hardware is employed, the hardware may include circuits that operate to perform the operations in analyzer 914.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 912 is a physical hardware system and includes one or more data processing systems. When more than one data processing system is present in computer system 912, those data processing systems are in communication with each other using a communications medium. The communications medium may be a network. The data processing systems may be selected from at least one of a computer, a server computer, a tablet, or some other suitable data processing system.

As depicted, computer system 912 includes a number of processor units 916 that are capable of executing program instructions 918 implementing processes in the illustrative examples. In other words, program instructions 918 are computer readable program instructions.

As used herein, a processor unit in the number of processor units 916 is a hardware device and is comprised of hardware circuits such as those on an integrated circuit that respond to and process instructions and program code that operate a computer. When the number of processor units 916 executes program instructions 918 for a process, the number of processor units 916 can be one or more processor units that are in the same computer or in different computers. In other words, the process can be distributed between processor units 916 on the same or different computers in a computer system 912.

Further, the number of processor units 916 can be of the same type or different type of processor units. For example, a number of processor units 916 can be selected from at least one of a single core processor, a dual-core processor, a multi-processor core, a general-purpose central processing unit (CPU), a graphics processing unit (GPU), a digital signal processor (DSP), or some other type of processor unit.

Computer system 912 with analyzer 914 can be in a number of different locations within satellite measurement system 900. For example, computer system 912 can be located in at least one of satellite 902, relay system 904, or a ground location such as terrestrial location 954.

In this illustrative example, analyzer 914 determines measured bit error rate 921 in information 952 carried in the laser beam received by the satellite. Analyzer 914 compares selected bit error rate 956 with measured bit error rate 921 to form comparison 961. Analyzer 914 determines distance 920 between relay system 904 and satellite 902 based comparison 961.

Additionally, analyzer 914 can determine acceleration of relay system 904. For example, analyzer 914 can determine additional measured bit error rates 960 from additional laser beams 962 transmitted from additional terrestrial locations 963. Analyzer 914 can compare selected bit error rate 956 with additional measured bit error rates 960 to form additional comparisons 964 and determine acceleration 968 of relay system 904 based on a rate of change in additional measured bit error rates 960 from additional comparisons 964.

Figure 10:
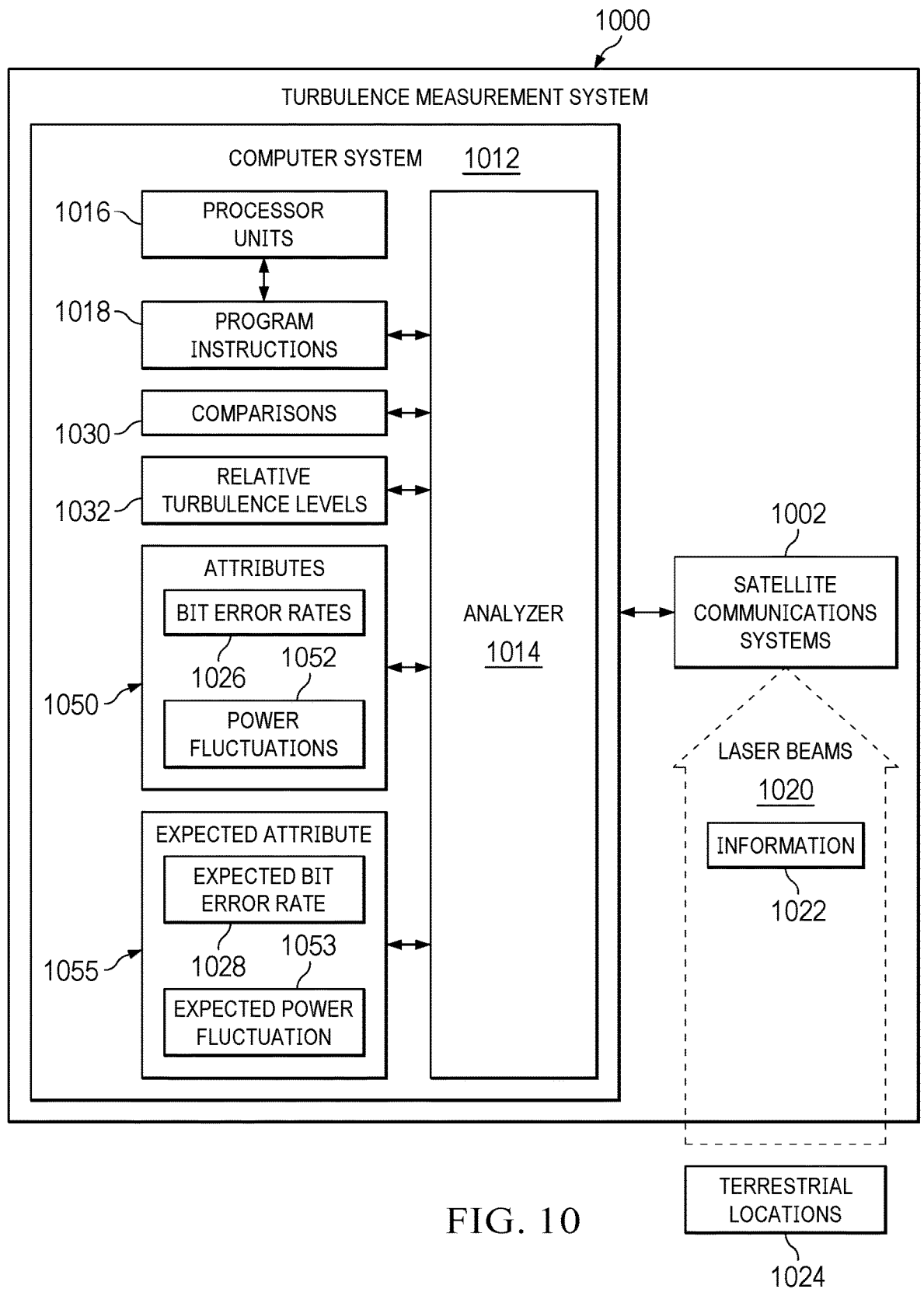
FIG. 10 is an illustration of a turbulence measurement system in accordance with an illustrative embodiment.

Turning now to FIG. 10, an illustration of a turbulence measurement system is depicted in accordance with an illustrative embodiment. In this illustrative example, turbulence measurement system 1000 comprises a set of satellite communications systems 1002, a computer system 1012, and analyzer 1014. As depicted, analyzer 1014 is located in computer system 1012. As with analyzer 914 in FIG. 9, analyzer 1014 can be implemented in software, hardware, firmware or a combination thereof. As depicted, processor unit 1016 can execute program instructions 1018 to run processes for analyzer 1014. In this illustrative example, computer system 1012 and analyzer 1014 can be in a number of different locations. For example, computer system 1012 and analyzer 1014 can be located in at least one satellite communication system in the set of satellite communications systems 1002, a terrestrial location, or in some other suitable location. Computer system 1012 and analyzer 1014 can be a distributed system in some illustrative examples.

In this illustrative example, a satellite communication system in the set of satellite communications systems 1002 can be implemented using satellite communications system 302 in FIG. 3. As depicted, the set of satellite communications systems 1002 can receive laser beams 1020 encoding information 1022 from terrestrial locations 1024.

In this illustrative example, analyzer 1014 can determine relative turbulence levels 1032 by analyzing a set of attributes 1050 for laser beams 1020. The set of attributes can include at least one of bit error rates 1026, power fluctuations 1052, or other attributes that can be measured in laser beams 1020. For example, analyzer 1014 can receive attributes 1050 determined by satellite communications systems 1002 from receiving laser beams 1020.

These attributes can be compared to expected attribute 1055 to form comparisons 1030. Comparisons 1030 can then be used to determine relative turbulence levels 1032 in the atmosphere above terrestrial locations 1024 from which laser beams 1020 traveled to reach satellite communications systems 1002.

When attributes 1050 are bit error rates 1026, analyzer 1014 can determine bit error rates 1026 for laser beams 1020 encoding information 1022 received by set of the satellite communications systems 1002 from terrestrial locations 1024. Analyzer 1014 compares the bit error rates 1026 measured in information 1022 to expected bit error rate 1028 without turbulence to form comparisons 1030. Analyzer 1014 determines relative turbulence levels 1032 based on comparisons 1030 of bit error rates 1026 to expected bit error rate 1028.

These relative turbulence levels can be used in training data sets for training machine learning models to generate weather predictions. Further, the use of these relative turbulence levels can also be used to determine where higher levels of turbulence are present. Further, turbulence can be measured at terrestrial locations from which laser beams are transmitted by using with sensors in these terrestrial locations. These measurements of turbulence can be used to correlate the relative turbulence to actual values for turbulence. Additionally, knowing the turbulence in a particular location can be used to estimate the turbulence in other locations in which sensors may not be present using relative turbulence levels 1032.

In making measurements of bit error rates 1026, adjustments may be needed at times to communications settings used for the transmission of laser beams 1020 or the reception of laser beams 1020 to obtain bit error rates 1026 that are not too low or too high for use in making comparisons 1030 using expected bit error rate 1028 as expected attribute 1055.

For example, a bit error rate that is always zero indicates that no errors are present. As a result, the manner in which laser beams 1020 are transmitted can result in no errors even though laser beams 1020 may travel through turbulence. For example, a bit error rate that is always of 0.5 can be considered to be too noisy to be compared to expected bit error rate 1028 to obtain meaningful information about turbulence in the atmosphere that laser beams 1020 may travel through from terrestrial locations 1024 to satellite communications systems 1002. As a result, identifying relative turbulence levels 1032 may not be feasible if the bit error rates are too low or too high.

In the illustrative examples, adjustments can be made in communication settings at least one of a laser communications system transmitting laser beams 1020 or a satellite communications system receiving laser beams 1020. For example, a set of communications settings that can be adjusted can be selected from at least an aperture size, reducing a beam power, a data rate, beam divergence, or some other setting that can be used to change bit error rates 1026 that are measured by satellite communications systems 1002.

In another example, analyzer 1014 can receive measurements of power fluctuations 1052 and laser beams 1020. These power fluctuations can be compared to expected power fluctuations 1053 to generate comparisons 1030. Comparisons 1030 can be used to determine relative turbulence levels 1032. Thus, turbulence measurement system 1000 can determine relative turbulence levels 1032 using attributes 1050 of laser beams 1020.

Figure 11:
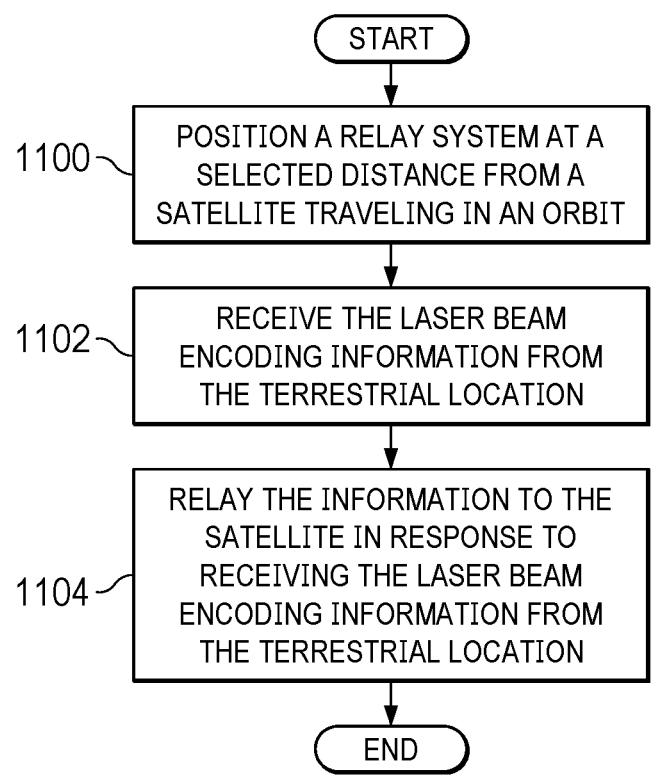
FIG. 11 is an illustration of a flowchart of a process for receiving a laser beam encoding information from a terrestrial location in accordance with an illustrative embodiment.

Turning next to FIG. 11, an illustration of a flowchart of a process for receiving a laser beam encoding information from a terrestrial location is depicted in accordance with an illustrative embodiment. The process in FIG. 11 can be implemented using a satellite communication system such as satellite communications system 302 and FIG. 3.

The process begins by positioning a relay system at a selected distance from a satellite traveling in an orbit (operation 1100). In operation 1100, the selected distance is set based on a speed of the satellite.

The process receives the laser beam encoding information from the terrestrial location (operation 1102). The process relays the information to the satellite in response to receiving the laser beam encoding information from the terrestrial location (operation 1104). The process terminates thereafter.

Figure 12:
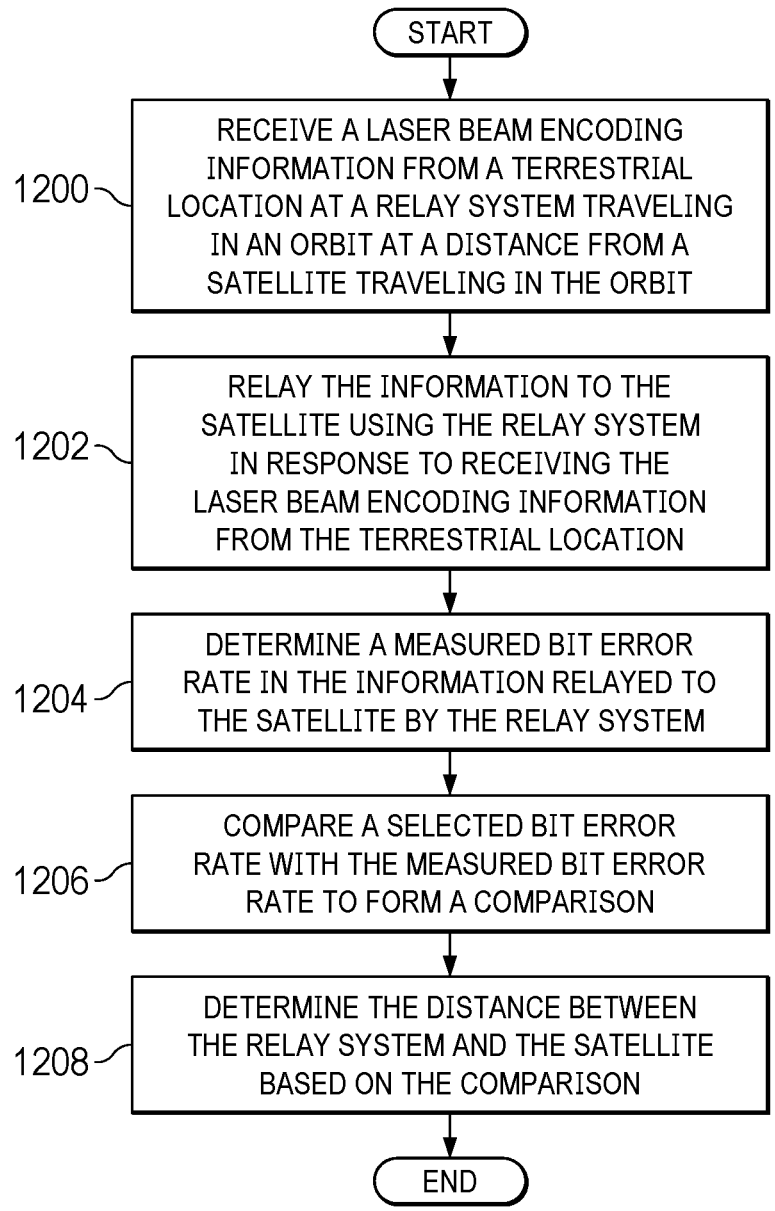
FIG. 12 is an illustration of a flowchart of a process for measuring a position in accordance with an illustrative embodiment.

Turning now to FIG. 12, an illustration of a flowchart of a process for measuring a position is depicted in accordance with an illustrative embodiment. The process illustrated in FIG. 12 can be implemented using satellite measurement system 900 in FIG. 9. For example, the processes can be implemented in analyzer 914 in computer system 912 in FIG. 9. This process can be used to determine the position of relay system and a satellite communication system.

The process begins by receiving a laser beam encoding information from a terrestrial location at a relay system traveling in an orbit at a distance from a satellite traveling in the orbit (operation 1200). The process relays the information to the satellite using the relay system in response to receiving the laser beam encoding information from the terrestrial location (operation 1202).

The process determines a measured bit error rate in the information relayed to the satellite by the relay system (operation 1204). The process compares a selected bit error rate with the measured bit error rate to form a comparison (operation 1206).

The process determines the distance between the relay system and the satellite based on the comparison (operation 1208). The process terminates thereafter.

Figure 13:
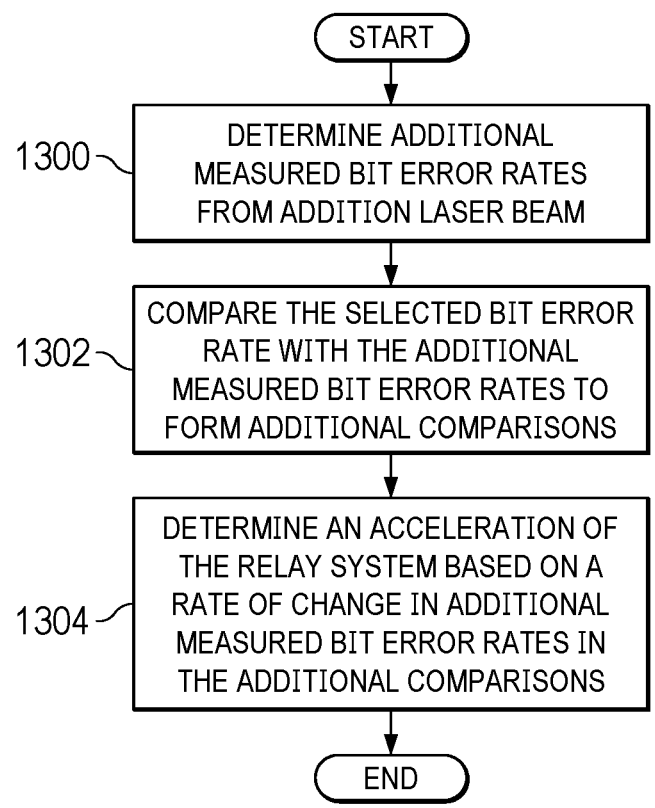
FIG. 13 is an illustration of a flowchart of a process for determining acceleration in accordance with an illustrative embodiment.

In FIG. 13, an illustration of a flowchart of a process for determining acceleration is depicted in accordance with an illustrative embodiment. The process illustrated in this figure is an example of additional operations that can be performed with the operations in FIG. 12. This process can be used to determine the acceleration of a relay system in a satellite communication system.

The process determines additional measured bit error rates from addition laser beam (operation 1300). The process compares the selected bit error rate with the additional measured bit error rates to form additional comparisons (operation 1302).

The process determines an acceleration of the relay system based on a rate of change in additional measured bit error rates in the additional comparisons (operation 1304). The process terminates thereafter.

Figure 14:
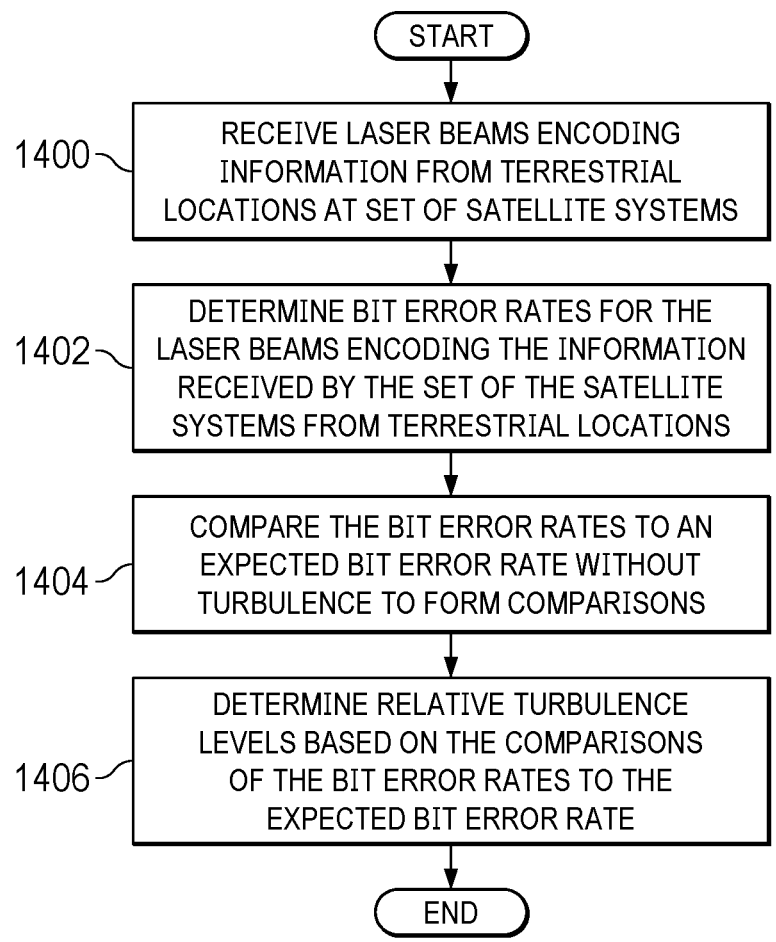
FIG. 14 is an illustration of a flowchart of a process for measuring turbulence in accordance with an illustrative embodiment.

With reference next to FIG. 14, an illustration of a flowchart of a process for measuring turbulence is depicted in accordance with an illustrative embodiment. The process illustrated in FIG. 14 can be implemented using turbulence measurement system 1000 in FIG. 10. For example, the processes can be implemented in analyzer 1014 in computer system 1012 in FIG. 10.

The process begins by receiving laser beams encoding information from terrestrial locations at set of satellite systems (operation 1400). In operation 1400, a satellite system in the set of satellite systems comprises a satellite and a relay system that is configured to receive a laser beam encoding information from a terrestrial location and relay the information to the satellite. The relay system is positioned at a selected distance from the satellite and wherein the selected distance is based on a speed of the satellite.

The process determines bit error rates for the laser beams encoding the information received by the set of the satellite systems from terrestrial locations (operation 1402).

The process compares the bit error rates to an expected bit error rate without turbulence to form comparisons (operation 1404). The process determines relative turbulence levels based on the comparisons of the bit error rates to the expected bit error rate (operation 1406). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program instructions, hardware, or a combination of the program instructions and hardware. When implemented in hardware, the hardware can, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

For example, the process in FIG. 14 has been described with respect to bit error rates. In other illustrative examples, the same process can be used for attributes other than or in addition to bit error rates.

Figure 15:
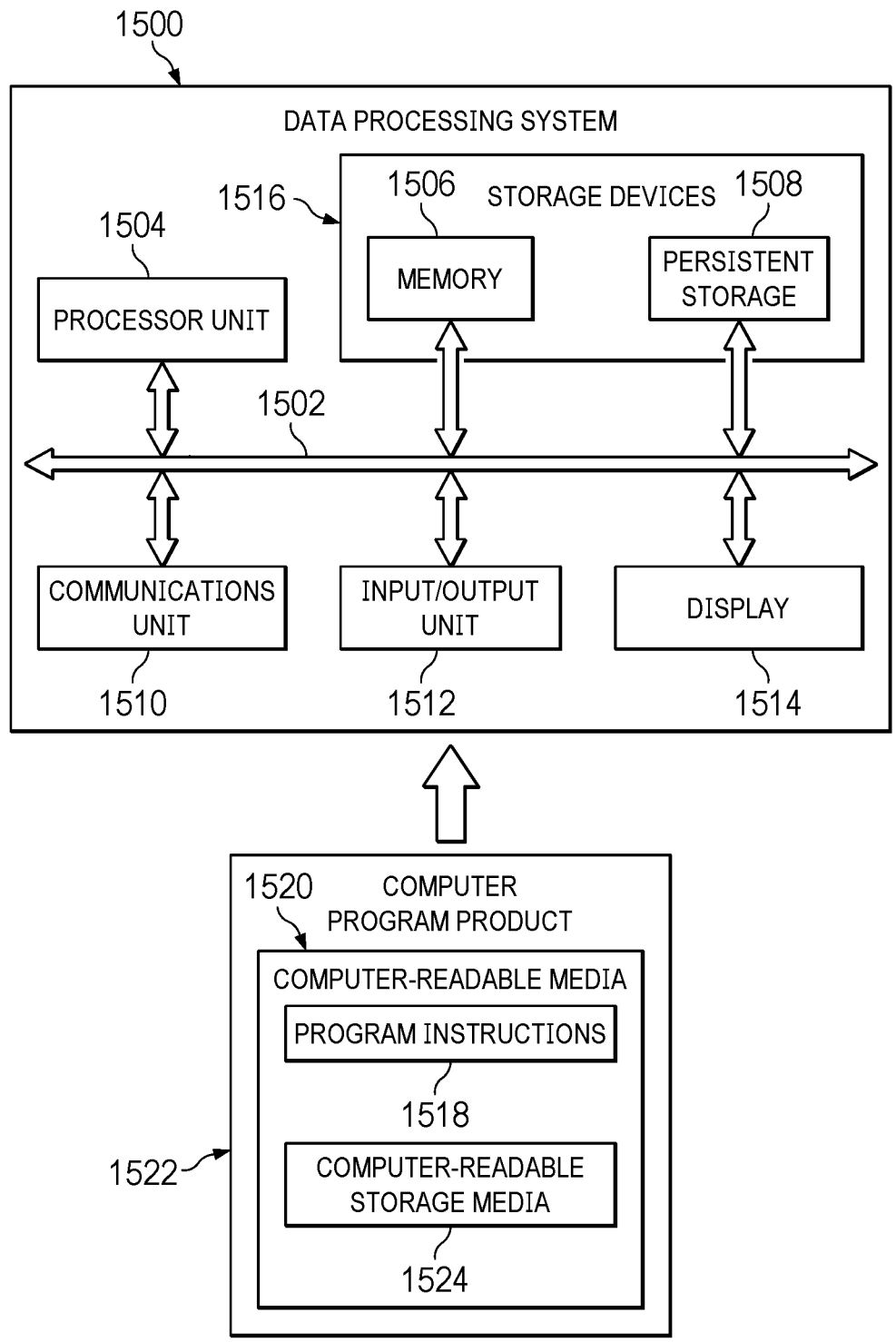
FIG. 15 is an illustration of a block diagram of a data processing system in accordance with an illustrative embodiment.

Turning now to FIG. 15, a block diagram of a data processing system is depicted in accordance with an illustrative embodiment. Data processing system 1500 can be used to implement computer system 912 in FIG. 9, computer system 1012 in FIG. 10, and computers and computing devices in the satellites and relay systems that employ computers. In this illustrative example, data processing system 1500 includes communications framework 1502, which provides communications between processor unit 1504, memory 1506, persistent storage 1508, communications unit 1510, input/output (I/O) unit 1512, and display 1514. In this example, communications framework 1502 takes the form of a bus system.

Processor unit 1504 serves to execute instructions for software that can be loaded into memory 1506. Processor unit 1504 includes one or more processors. For example, processor unit 1504 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1504 can be implemented using one or more heterogeneous processor systems in which a main processor is present with secondary processors on a single chip. As another illustrative example, processor unit 1504 can be a symmetric multi-processor system containing multiple processors of the same type on a single chip.

Memory 1506 and persistent storage 1508 are examples of storage devices 1516. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 1516 may also be referred to as computer readable storage devices in these illustrative examples. Memory 1506, in these examples, can be, for example, a random-access memory or any other suitable volatile or non-volatile storage device. Persistent storage 1508 may take various forms, depending on the particular implementation.

For example, persistent storage 1508 may contain one or more components or devices. For example, persistent storage 1508 can be a hard drive, a solid-state drive (SSD), a flash memory, a rewritable optical disk, a rewritable magnetic tape, or some combination of the above. The media used by persistent storage 1508 also can be removable. For example, a removable hard drive can be used for persistent storage 1508.

Communications unit 1510, in these illustrative examples, provides for communications with other data processing systems or devices. In these illustrative examples, communications unit 1510 is a network interface card.

Input/output unit 1512 allows for input and output of data with other devices that can be connected to data processing system 1500. For example, input/output unit 1512 may provide a connection for user input through at least one of a keyboard, a mouse, or some other suitable input device. Further, input/output unit 1512 may send output to a printer. Display 1514 provides a mechanism to display information to a user.

Instructions for at least one of the operating system, applications, or programs can be located in storage devices 1516, which are in communication with processor unit 1504 through communications framework 1502. The processes of the different embodiments can be performed by processor unit 1504 using computer-implemented instructions, which may be located in a memory, such as memory 1506.

These instructions are referred to as program instructions, computer usable program instructions, or computer readable program instructions that can be read and executed by a processor in processor unit 1504. The program instructions in the different embodiments can be embodied on different physical or computer readable storage media, such as memory 1506 or persistent storage 1508.

Program instructions 1518 are located in a functional form on computer readable media 1520 that is selectively removable and can be loaded onto or transferred to data processing system 1500 for execution by processor unit 1504. Program instructions 1518 and computer readable media 1520 form computer program product 1522 in these illustrative examples. In the illustrative example, computer readable media 1520 is computer readable storage media 1524.

Computer readable storage media 1524 is a physical or tangible storage device used to store program instructions 1518 rather than a medium that propagates or transmits program instructions 1518. Computer readable storage media 1524 may be at least one of an electronic storage medium, a magnetic storage medium, an optical storage medium, an electromagnetic storage medium, a semiconductor storage medium, a mechanical storage medium, or other physical storage medium. Some known types of storage devices that include these mediums include: a diskette, a hard disk, a random access memory (RAN), a read-only memory (ROM), an erasable programmable read-only memory (EPROM or Flash memory), a static random access memory (SPA), a compact disc read-only memory (CD-ROM), a digital versatile disk (DVD), a memory stick, a floppy disk, a mechanically encoded device, such as punch cards or pits/lands formed in a major surface of a disc, or any suitable combination thereof.

Computer readable storage media 1524, as that term is used in the present disclosure, is not to be construed as storage in the form of transitory signals per se, such as at least one of radio waves or other freely propagating electromagnetic waves, electromagnetic waves propagating through a waveguide, light pulses passing through a fiber optic cable, electrical signals communicated through a wire, or other transmission media.

Further, data can be moved at some occasional points in time during normal operations of a storage device. These normal operations include access, de-fragmentation or garbage collection. However, these operations do not render the storage device as transitory because the data is not transitory while the data is stored in the storage device.

Alternatively, program instructions 1518 can be transferred to data processing system 1500 using a computer readable signal media. The computer readable signal media are signals and can be, for example, a propagated data signal containing program instructions 1518. For example, the computer readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer readable media 1520" can be singular or plural. For example, program instructions 1518 can be located in computer readable media 1520 in the form of a single storage device or system. In another example, program instructions 1518 can be located in computer readable media 1520 that is distributed in multiple data processing systems. In other words, some instructions in program instructions 1518 can be located in one data processing system while other instructions in program instructions 1518 can be located in one data processing system. For example, a portion of program instructions 1518 can be located in computer readable media 1520 in a server computer while another portion of program instructions 1518 can be located in computer readable media 1520 located in a set of client computers.

The different components illustrated for data processing system 1500 are not meant to provide architectural limitations to the manner in which different embodiments can be implemented. In some illustrative examples, one or more of the components may be incorporated in or otherwise form a portion of, another component. For example, memory 1506, or portions thereof, may be incorporated in processor unit 1504 in some illustrative examples. The different illustrative embodiments can be implemented in a data processing system including components in addition to or in place of those illustrated for data processing system 1500. Other components shown in FIG. 15 can be varied from the illustrative examples shown. The different embodiments can be implemented using any hardware device or system capable of running program instructions 1518.

Thus, the illustrative embodiments provide a method, apparatus, and system for satellite communications. In one illustrative example, a satellite communications system comprising a satellite traveling in an orbit and a relay system. The relay system is configured to receive a laser beam encoding information from a terrestrial location and relay the information to the satellite. The relay system is positioned at a selected distance from the satellite and the selected distance is set based on a speed of the satellite.

The different illustrative examples enable receiving laser beams from terrestrial locations with fast-moving satellites. The presence of atmospheric conditions that changed the path of the laser beam are not an issue with respect to the angle at which the laser beam was received. The relay system in the different illustrative examples avoids needing to predict a point ahead angle for satellites that are not stationary.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A satellite communications system that comprises:
a satellite in an orbit; and
a relay system comprising a reflector is configured to:
receive a laser beam encoding information from a terrestrial location at the reflector; and
relay the information to the satellite, wherein the reflector is positioned at a selected distance from the satellite.

2. The satellite communications system of claim 1, wherein the relay system has a location selected from one of: behind the satellite or ahead of the satellite.

3. A satellite communications system that comprises:
a satellite in an orbit; and
a relay system configured to:
receive a laser beam encoding information from a terrestrial location; and
relay the information to the satellite, wherein the relay system is positioned at a selected distance from the satellite based on a speed of the satellite, wherein the relay system comprises:
a boom having a first end connected to the satellite; and
a reflector connected to a second end of the boom, wherein the boom positions the reflector at the distance from the satellite and wherein the reflector has an orientation configured to reflect the laser beam from the terrestrial location to the satellite.

4. The satellite communications system of claim 3, wherein the boom has an adjustable length.

5. A satellite communications system that comprises:
a satellite in an orbit; and
a relay system configured to:
receive a laser beam encoding information from a terrestrial location; and
relay the information to the satellite, wherein the relay system is positioned at a selected distance from the satellite based on a speed of the satellite, wherein the relay system comprises:
a relay satellite in the orbit at the selected distance from the satellite; and
a reflector connected to the satellite, wherein the satellite positions the reflector at the selected distance from the satellite and wherein the reflector has an orientation configured to reflect the laser beam from the terrestrial location to the satellite.

6. The satellite communications system of claim 5, wherein the relay system is configured to the selected distance to the satellite reduce a bit error rate for the information carried in the laser beam based upon a change of the distance.

7. The satellite communications system of claim 5, wherein the relay satellite is configured to change the distance based upon images selected from of one of the satellite or the relay satellite, generated from a camera.

8. The satellite communications system of claim 5, wherein the relay satellite is selected from a group comprising a CubeSat, a mini satellite, a micro satellite, a nano satellite, and a pico satellite.

9. A satellite communications system that comprises:
a satellite in an orbit; and
a relay system configured to:
 receive a laser beam encoding information from a terrestrial location; and
 relay the information to the satellite, wherein the relay system is positioned at a selected distance from the satellite based on a speed of the satellite, wherein the relay system comprises:
a relay satellite in the orbit at the distance, wherein the relay satellite is configured to:
 receive the laser beam;
 decode the information in the laser beam;
 encode the information into a signal; and
 transmit the signal to the satellite.

10. The satellite communications system of claim 9, wherein the signal selected from one a least one of a laser beam, a radio frequency signal, a microwave signal, or an infrared signal.

11. A satellite communications system that comprises:
a satellite in an orbit; and
a relay system configured to:
 receive a laser beam encoding information from a terrestrial location; and
 relay the information to the satellite, wherein the relay system is positioned at a selected distance from the satellite based on a speed of the satellite, wherein the relay system comprises a relay satellite in a different orbit from the satellite, wherein the relay satellite is configured to:
 receive the laser beam encoding the information from the terrestrial location; and
 relay the information to the satellite in response to the relay satellite being along a same angular position as the satellite was when a prior laser beam was transmitted by the satellite to the terrestrial location.

12. A satellite communications system that comprises:
a satellite in an orbit; and
a relay system configured to:
 receive a laser beam encoding information from a terrestrial location; and
 relay the information to the satellite, wherein the relay system is positioned at a selected distance from the satellite based on a speed of the satellite, wherein the relay system comprises:
a towline having a first end to the satellite; and
a reflector connected to a second end of the towline, wherein the towline positions the reflector at the selected distance from the satellite and wherein the reflector has an orientation that reflects the laser beam encoding the information from the terrestrial location to the satellite.

13. The satellite communications system of claim 12, wherein the relay system further comprises a drag device connected to the second end of the towline.

14. A method for receiving a laser beam encoding information from a terrestrial location, the method comprising:
positioning a reflector in a relay system at a selected distance from a satellite traveling in an orbit, wherein the selected distance is set based on a speed of the satellite;
receiving, by the reflector in the relay system, the laser beam encoding information from the terrestrial location; and
relaying, by the reflector in the relay system, the information to the satellite in response to receiving the laser beam encoding information from the terrestrial location.

15. A method for receiving a laser beam encoding information from a terrestrial location, the method comprising:
positioning a relay system at a selected distance from a satellite traveling in an orbit, wherein the selected distance is set based on a speed of the satellite;
receiving, in the relay system, the laser beam encoding information from the terrestrial location; and
relaying the information to the satellite in response to receiving the laser beam encoding information from the terrestrial location, wherein the relay system comprises a boom comprising a first end connected to the satellite and a second end connected to a reflector, wherein:
the boom positions the reflector at the selected distance from the satellite; and
the reflector has an orientation reflecting the laser beam from the terrestrial location encoding the information to the satellite.

16. A method for receiving a laser beam encoding information from a terrestrial location, the method comprising:
positioning a relay system at a selected distance from a satellite traveling in an orbit, wherein the selected distance is set based on a speed of the satellite;
receiving, in the relay system, the laser beam encoding information from the terrestrial location; and
relaying the information to the satellite in response to receiving the laser beam encoding information from the terrestrial location, wherein the relay system comprises a relay satellite that travels in the orbit with a fixed position relative to the satellite and a reflector connected to the satellite, wherein the satellite positions the reflector at the selected distance from the satellite and wherein the reflector has an orientation reflecting the laser beam encoding the information from the terrestrial location to the satellite.

17. The method of claim 16, wherein the relay system is configured to the selected distance to the satellite reduce a bit error rate for the information carried in the laser beam based upon a change of the distance.

18. A method for receiving a laser beam encoding information from a terrestrial location, the method comprising:
positioning a relay system at a selected distance from a satellite traveling in an orbit, wherein the selected distance is set based on a speed of the satellite;
receiving, in the relay system, the laser beam encoding information from the terrestrial location; and
relaying the information to the satellite in response to receiving the laser beam encoding information from the terrestrial location,
the relay system comprises a relay satellite:
traveling in the orbit at the selected distance from the satellite;
receiving the laser beam encoding the information from the terrestrial location;
decoding the information in the laser beam; and
encoding the information into a signal, and transmits the signal encoding the information to the satellite.

19. A method for receiving a laser beam encoding information from a terrestrial location, the method comprising:

positioning a relay system at a selected distance from a satellite traveling in an orbit, wherein the selected distance is set based on a speed of the satellite;

receiving, in the relay system, the laser beam encoding information from the terrestrial location; and relaying the information to the satellite in response to receiving the laser beam encoding information from the terrestrial location, wherein the relay system comprises a towline comprising a first end connected to the satellite and a second end connected to a reflector comprising orientation reflecting the laser beam encoding the information from the terrestrial location to the satellite and wherein the towline positions the reflector at the selected distance from the satellite.

20. The method of claim 19, wherein the relay system further comprises a drag device connected to the second end of the towline.

\* \* \* \* \*